United States Patent
Carr et al.

[11] Patent Number: 6,091,948
[45] Date of Patent: Jul. 18, 2000

[54] ONE NUMBER SERVICE USING MOBILE ASSISTED CALL FORWARDING FACILITIES

[75] Inventors: Jerry Richard Carr; Robert C. Witter, both of Lawrenceville; Clifton J. Barber, Forest Park; Michael A. Wise, Duluth; Anthony B. Waldroup, Suwanee, all of Ga.

[73] Assignee: Oki Telecom, Inc., Swanee, Ga.

[21] Appl. No.: 08/808,390

[22] Filed: Feb. 28, 1997

[51] Int. Cl.⁷ .................................................. H04B 1/00
[52] U.S. Cl. ........................... 455/414; 455/417; 455/445
[58] Field of Search .................................... 455/414, 445, 455/456, 524, 461, 426, 417; 379/211, 67.1

[56] References Cited

U.S. PATENT DOCUMENTS

| | | | |
|---|---|---|---|
| 4,511,761 | 4/1985 | Yamazaki et al. | 179/2 EA |
| 4,768,221 | 8/1988 | Green et al. | 379/67.1 |
| 5,127,042 | 6/1992 | Gillig et al. | 379/59 |
| 5,177,426 | 1/1993 | Nakanishi et al. | 320/13 |
| 5,197,092 | 3/1993 | Bamburak | 379/59 |
| 5,276,729 | 1/1994 | Higuchi et al. | 379/58 |
| 5,325,419 | 6/1994 | Connolly et al. | 455/461 |
| 5,359,651 | 10/1994 | Dreganoff | 379/354 |
| 5,515,228 | 5/1996 | Nakayama et al. | 361/88 |
| 5,526,400 | 6/1996 | Nguyen | 455/445 |
| 5,526,403 | 6/1996 | Tam | 455/426 |
| 5,577,103 | 11/1996 | Foti | 379/211 |
| 5,600,704 | 2/1997 | Ahlberg et al. | 455/445 |
| 5,613,201 | 3/1997 | Alford et al. | 455/331 |
| 5,657,375 | 8/1997 | Connolly et al. | 455/461 |
| 5,661,780 | 8/1997 | Yamamoto et al. | 379/61 |
| 5,673,308 | 9/1997 | Akhavan | 455/445 |
| 5,724,417 | 3/1998 | Martholomew et al. | 379/211 |
| 5,736,964 | 4/1998 | Ghosh et al. | 342/457 |
| 5,754,625 | 5/1998 | Shimura | 379/61 |
| 5,867,798 | 2/1999 | Inukai et al. | 455/573 |
| 5,920,812 | 7/1999 | Palvianen | 455/417 |
| 5,953,657 | 9/1999 | Ghisler | 455/417 |

*Primary Examiner*—Salvatore Cangialosi
*Attorney, Agent, or Firm*—Thomas, Kayden, Horstemeyer & Risley LLP

[57] ABSTRACT

A call forwarding automation feature in a wireless telephone provides automated activation and deactivation of conventional carrier system call forwarding. The wireless telephone provides for storing multiple call forwarding telephone numbers, selecting a call forwarding telephone number based upon location information, automatically activating call forwarding to the selected telephone number during a wireless telephone power down sequence, and automatically deactivating the call forwarding during a wireless telephone power up sequence. Programming is also provided for configuring and enabling the call forwarding feature. In another embodiment, the wireless telephone automatically prompts the user for activation of call forwarding each time the user powers down the wireless telephone. The process also provides the user an ability to select from a list of stored call forwarding telephone numbers to use, as well as providing the user an ability to manually input a new telephone number. In this embodiment, the location information is used only to provide a suggested forwarding telephone number, rather than automatically activating call forwarding without user input during the power down sequence. If user input is not received during a defined time period in response to the prompt, the wireless telephone automatically activates call forwarding only if an automatic call forwarding timeout default option is enabled. The user is also automatically prompted each time the user powers up the wireless telephone to deactivate call forwarding if call forwarding is activated, and real-time idle mode automated call forwarding activation and deactivation are also provided.

45 Claims, 10 Drawing Sheets

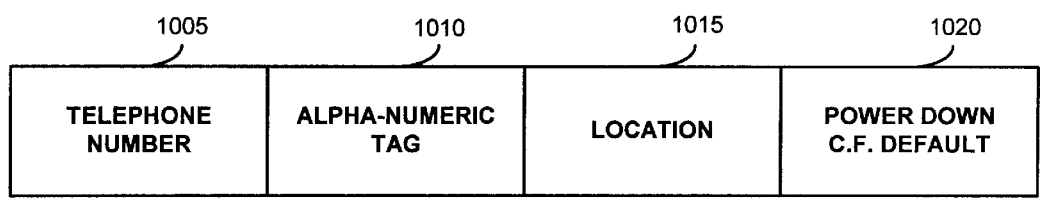
FIG. 10

ONE NUMBER SERVICE USING MOBILE ASSISTED CALL FORWARDING FACILITIES

BACKGROUND OF INVENTION

The present invention relates generally to the field of personal communications systems, and more specifically, to the field of wireless call forwarding systems.

The wireless telephone industry has long noted that the proliferation of wireless telephones, voice mail systems, pagers, etc. has caused a great deal of confusion since callers often need to know multiple telephone numbers (i.e., office, home, wireless telephone, pager, travel destination telephone numbers, etc.) to have a good probability of contacting the user (subscriber). In addition, calls to wireless telephones are routinely missed if the wireless telephone is turned off Even if the caller is aware of other likely locations for the user, the probability of contact may still be very low in light of inherent user mobility. This results in loss of accessibility for the mobile telephone user and may negatively impact productivity, business income, family contact, etc. These are all major factors in the original decision for purchasing a wireless telephone.

One attempt to solve this problem is to have the subscriber provide to the service provider a list of alternate telephone numbers at which the user may be reached. The user would order the list in the order in which the service provider should try the numbers. Callers would only be given the one mobile telephone number. When a call is not answered by the mobile phone, the service provider would then call each of the preprogrammed numbers in succession. This solution leads to a great deal of inconvenience for the calling party since accessing all numbers in the list could take a long time. Additionally, the user may still be at places other than the locations indicated by the preprogrammed list.

A second attempt to solve this problem is based on hardware supported call forwarding. Special hardware, such as a landline residential base station in a dual mode cordless/cellular system, detects the presence of the mobile unit when within range of the special hardware (i.e., the mobile unit is at work or at home). The special hardware then notifies the wireless telephone system to forward all calls to the preprogrammed land line telephone at that location. This solution requires a large investment by the user in the special hardware, as well as system infrastructure modifications, and only works if the mobile unit is within range of the special hardware.

There is, therefore, a need in the industry for a system for addressing these and other related and unrelated problems.

SUMMARY OF INVENTION

A call forwarding automation feature in a wireless telephone provides automated activation and deactivation of conventional carrier system call forwarding. According to a first preferred embodiment of the present invention, the call forwarding automation system includes logic and memory for storing multiple call forwarding telephone numbers, selecting a call forwarding telephone number based upon base station identification (location) information, automatically activating call forwarding to the selected telephone number during a wireless telephone power down sequence, and automatically deactivating the call forwarding during a wireless telephone power up sequence. Of course, programming is also provided for configuring and enabling the call forwarding feature.

According to a second preferred embodiment of the present invention, the wireless telephone automatically prompts the user for activation of call forwarding each time the user powers down the wireless telephone. The process provides the user an ability to select from a list of stored call forwarding telephone numbers to use, as well as providing the user an ability to manually input a new telephone number. In a manner similar to the first preferred embodiment of the present invention, location information is initially analyzed, but the information is used only to provide a suggested forwarding telephone number, rather than automatically activating call forwarding without user input during the power down sequence. If user input is not received during a defined time period in response to the prompt, the wireless telephone automatically activates call forwarding only if an automatic call forwarding time-out default option is enabled. The user is also automatically prompted each time the user powers up the wireless telephone to deactivate call forwarding if call forwarding is activated, and real-time idle mode automated call forwarding activation and deactivation are also provided.

A third preferred embodiment of the present invention includes the list selection prompting of the second preferred embodiment without the location information analysis of the first preferred embodiment. Thus, the user is simply presented with a list of stored call forwarding telephone numbers without a location-determined suggestion.

In accordance with another preferred embodiment of the present invention, the wireless telephone maintains in memory a plurality of call forwarding activation and deactivation sequences indexed with respect to system identification codes (SIDs). Thus, call forwarding activation and deactivation sequences are selected by the wireless telephone according to the SID of a particular carrier system being used at any given time. In another preferred embodiment of the present invention, a plurality of lists of stored call forwarding telephone numbers are also similarly indexed with respect to SIDs. Finally, SID indexing is used in yet another embodiment of the present invention to also provide for various power up and power down defaults and prompting options based upon SIDS.

It is therefore an object of the present invention to provide a wireless telephone feature which automatically enables a wireless telephone subscriber to be contacted at various locations by using a single telephone number.

Another object of the present invention is to provide a wireless telephone call forwarding activation and deactivation automation feature.

Yet another object of the present invention is to provide a wireless telephone call forwarding activation and deactivation feature which automatically interacts with a conventional call forwarding system of a wireless carrier.

Still another object of the present invention is to provide a wireless telephone call forwarding activation and deactivation feature which provides system-specific interaction with multiple conventional call forwarding systems of various wireless carriers.

Another object of the present invention is to provide a wireless telephone call forwarding activation and deactivation automation feature which requires a small number of keystrokes during use.

Yet another object of the present invention is to provide a wireless telephone call forwarding feature which intelligently selects a proper call forwarding telephone number based on locational information received from at least one base station.

Other objects, features, and advantages of the present invention will become apparent upon reading and understanding the present specification, when taken in conjunction with accompanying drawings.

BRIEF DESCRIPTION OF THE DRAWINGS

FIG. 10 is block diagram representation of the memory architecture of the wireless telephone, showing the organization of the call forwarding memory, in accordance with one preferred embodiment of the present invention.

DETAILED DESCRIPTION OF THE PREFERRED EMBODIMENTS

Figure 1:
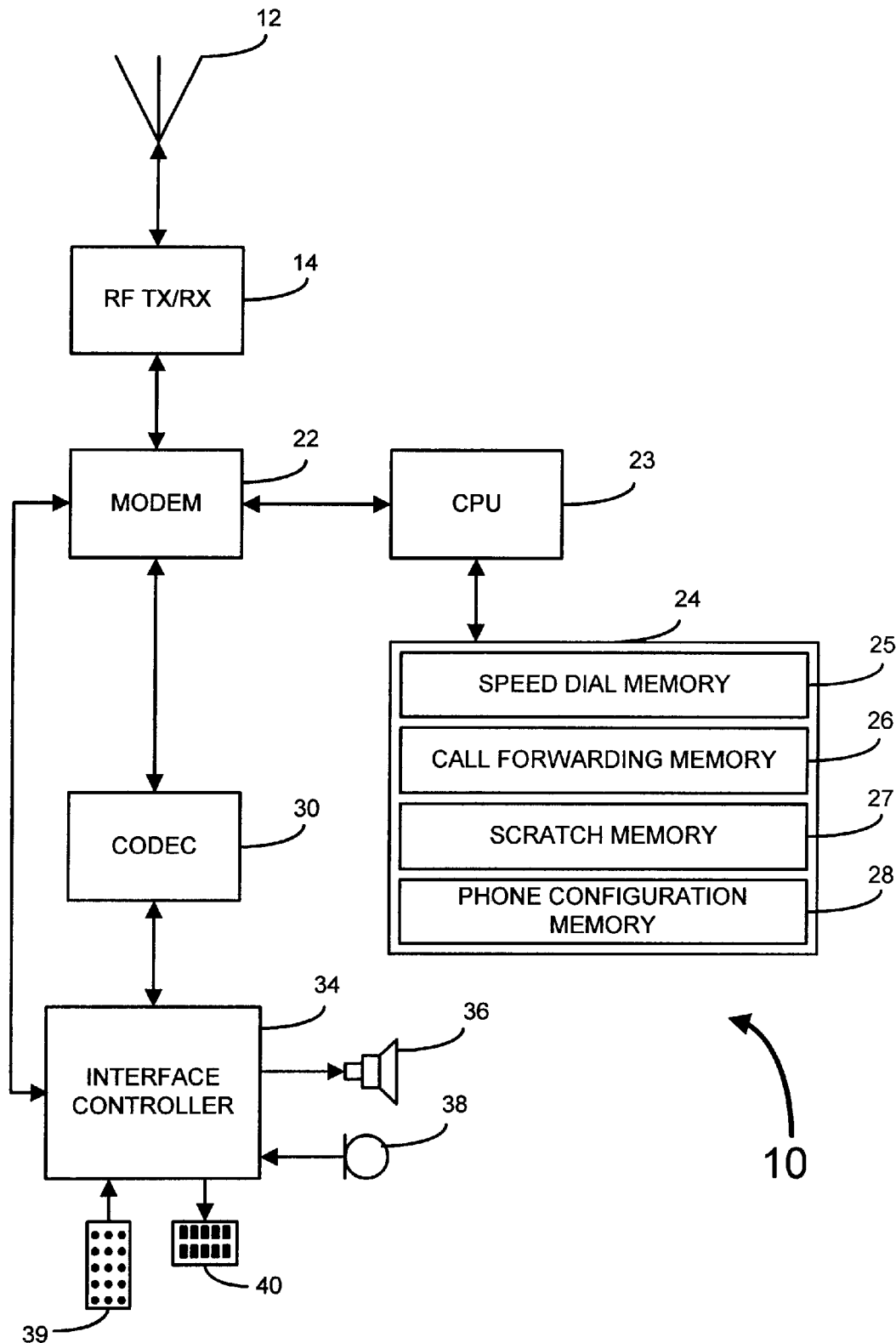
FIG. 1 is a block diagram representation of a wireless telephone, in accordance with preferred embodiments of the present invention.

Referring now in greater detail to the drawings in which like numerals represent like components throughout the several views, FIG. 1 shows a block diagram of a wireless telephone 10 in accordance with preferred embodiments of the present invention. The diagram applies to a variety of wireless telephones of various embodiments of the present invention, as well as various types of conventional wireless telephones, including analog, dual mode cellular, digital, and PCS telephones. The specific keystroke sequences described in this specification are meant to be representative of the keystrokes that would be required to perform the desired operations and are not meant to be the definitive or exclusive keystrokes for performing the desired operations.

According to the first preferred embodiment of the present invention, radio signals are received through an antenna 12 and then filtered and mixed to lower frequencies in a radio frequency transmit/receive (RF TX/RX) circuit 14. A central processing unit (CPU) 23 is connected to a memory 24 which provides storage space for the storing of telephone numbers (SPEED DIAL MEMORY 25 and CALL FORWARDING MEMORY 26), SCRATCH MEMORY 27, and configuration information (PHONE CONFIGURATION MEMORY 28). As controlled by the wireless telephone 10, a modem circuit 22 demodulates the received radio signals into a continuous signal stream, which according to the first preferred embodiment of the present invention, is decoded by the coder/decoder (CODEC) 30 into an audio signal which is controllably amplified by an interface controller 34 and output through a telephone speaker 36. Likewise, a reverse path is followed through the wireless telephone 10 as the telephone microphone 38 detects user speech. A keypad 39 and a display 40 provide conventional user input and output.

Figure 2:
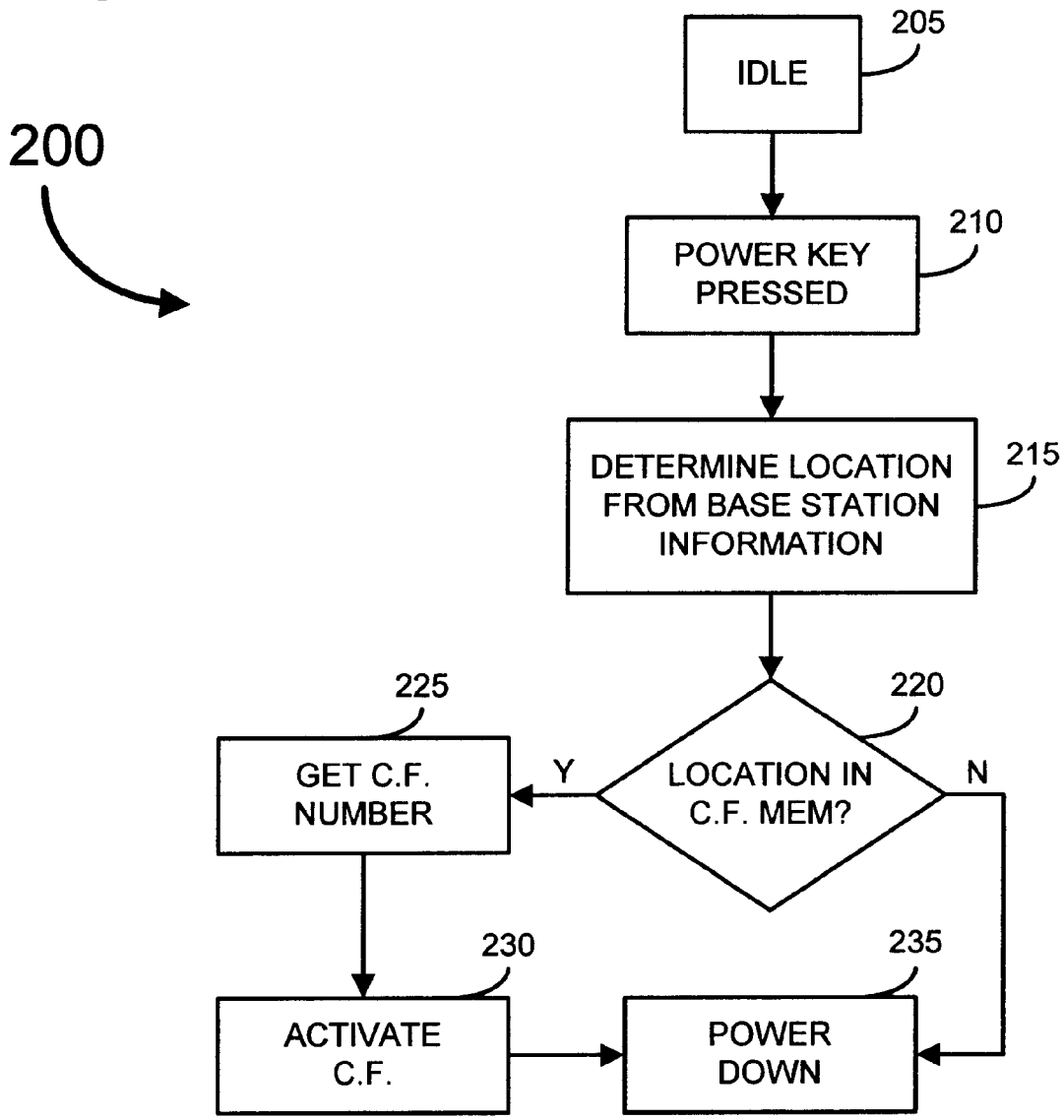
FIG. 2 is a flow chart representation of steps taken by the wireless telephone during the power down automatic activation of call forwarding based on the location of the telephone requiring no user intervention, in accordance with the first preferred embodiment of the present invention.

Refer now to FIG. 2 which shows a flow chart of the steps taken by the wireless telephone 10 (FIG. 1) during a call forwarding activation process 200 at wireless telephone 10 power down, using location information provided by a base station, in accordance with a first preferred embodiment of the present invention.

The call forwarding activation process 200 is in an idle state (step 205) before a user presses a power key on the keypad 39 (FIG. 1) to power down the wireless telephone 10. After detecting the user pressing the power key (step 210), the wireless telephone 10 (FIG. 1) analyzes base station location information to determine the location (step 215) of the wireless telephone 10 (FIG. 1). In one implementation, communicates with the base station is necessary to acquire this information, and in other implementations, location information is already available based on existing communication connections. In some preferred embodiments, the wireless telephone 10 will only be able to determine the unique identification number of a home base station, while in other embodiments, the wireless telephone 10 will be able to determine its physical location to a greater degree of certainty based upon base station location information and strengths of signals from multiple base stations.

Subsequently, the wireless telephone 10 searches a call forwarding telephone number list stored in CALL FORWARDING MEMORY 26 (FIG. 1) for a telephone number associated with corresponding location information. If corresponding location information is found (decision 220), the associated telephone number is retrieved from CALL FORWARDING MEMORY 26 (step 225). Subsequently, call forwarding is activated (step 230) according to a conventional call forwarding sequence stored in the PHONE CONFIGURATION MEMORY 28 (FIG. 1). According to an alternate embodiment of the present invention, since particular wireless telephone systems have different sequences of operations required for the activation and deactivation of call forwarding, stored in the PHONE CONFIGURATION MEMORY 28 (FIG. 1) are the sequences required to activate and deactivate call forwarding for various wireless telephone systems, indexed by system identification code (SID). After activation of call forwarding (step 230), the wireless telephone 10 powers down (step 235). If the wireless telephone 10 was not able to find a telephone number with stored location information corresponding to the location information determined based upon currently communicating base station information, the wireless telephone 10 simply powers down in step 235.

Figure 3:
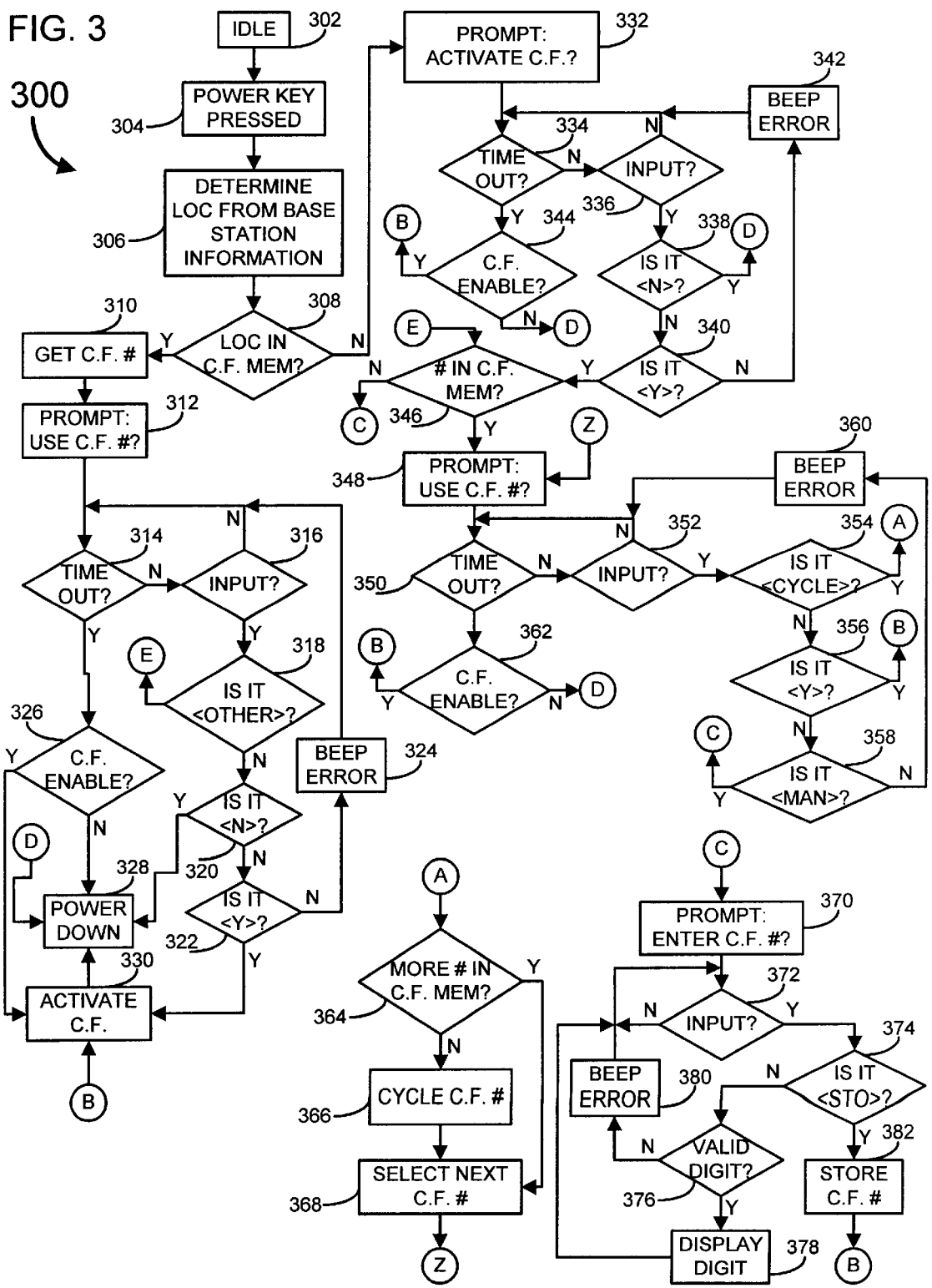
FIG. 3 is a flow chart representation of steps taken by the wireless telephone during the power down automatic activation of call forwarding based on the location of the telephone and list-based user intervention, in accordance with the second preferred embodiment of the present invention.

Refer now to FIG. 3 which shows a flow chart of the steps taken by the wireless telephone 10 (FIG. 1) during a call forwarding activation process 300 according to a second preferred embodiment of the present invention which uses location information and user input. The call forwarding activation process 300 is in an idle state (step 302) before a user presses a power key on the keypad 39 (FIG. 1) to power down the wireless telephone 10. After detecting the user pressing the power key, the wireless telephone 10 analyzes base station location information to determine the current location of the wireless telephone 10 (step 306), as in the first preferred embodiment. Similarly, the wireless telephone 10 then determines (decision 308) whether the detected location corresponds to a telephone number stored in CALL FORWARDING MEMORY 26 (FIG. 1), retrieving the number if so (step 310).

Subsequently, the user is prompted with a message on the display 40 asking if the user wishes to activate call forwarding to the retrieved telephone number. At this time, the user is given a specified amount of time to enter an affirmative <Y> indicating a desire to use the suggested retrieved telephone number, a negative <N> indicating a desire not to use either the suggested telephone number or any other telephone number, or <OTHER> to select a different call forwarding number, according to one preferred embodiment of the present invention. The notation of type <SOME ACTION> means the wireless telephone 10 will, according to this preferred embodiment of the present invention, display a softkey that will perform that specified action if the user presses the softkey. A softkey is a key in the keypad 39 (FIG. 1) that has no fixed function. The softkey is programmable by the wireless telephone 10 to perform different functions. The decision blocks 314, 316, 318, 320, and 322 represent various processing of the user input. If the user should press any key other than the three permitted keys, the wireless telephone 10 will notify the user of the error (step 324) by beeping an error tone and continue attempting to process user input.

If the user chooses to use a different call forwarding telephone number, the call forwarding activation process 300 moves to decision 346 from decision 318 where it will ultimately prompt the user to select a different telephone number if any are available in the CALL FORWARDING MEMORY 26 (FIG. 1), as discussed in greater detail below. If the user selects to not use the suggested call forwarding telephone number or any other number (decision 320), the call forwarding activation process 300 will power down the wireless telephone 10 (step 328). Finally, if the user selects to use the suggested call forwarding telephone number (decision 322), the call forwarding activation process 300 will activate call forwarding (step 330) and then power down the wireless telephone 10 (step 328), as with the first preferred embodiment. If the user permits the time to expire without providing input (decision 314), the wireless telephone 10 examines (decision 326) PHONE CONFIGURATION MEMORY 28 (FIG. 1) to determine whether the wireless telephone 10 is set to default to enabling call forwarding after time for input is expired. If the wireless telephone 10 is set to default to enable call forwarding, then the wireless telephone 10 will activate call forwarding (step 330) before powering down (step 328); otherwise, the wireless telephone 10 simply powers down (step 328).

If no corresponding call forwarding numbers are found (decision 308) in CALL FORWARDING MEMORY 26 based on the location information, the wireless telephone 10 will prompt the user (step 332) to determine if the user wishes to nonetheless activate call forwarding. At this time, the user is given a specified amount of time to enter an affirmative <Y> or a negative <N>. The decision blocks 334, 336, 338, and 340 represent processing of the user input. If the user should press any key other than the two permitted keys, the wireless telephone 10 will notify the user of the error (step 342) by beeping an error tone and returning to process user input (decision 334). If the user allows the time to expire (decision 334), the wireless telephone 10 will examine PHONE CONFIGURATION MEMORY 28 (FIG. 1) to see if the wireless telephone 10 is set to default to enable call forwarding. If the wireless telephone 10 is set to default to enable call forwarding, then the wireless telephone will activate call forwarding (step 330), using the first number in CALL FORWARDING MEMORY 26, before powering down (step 328). If the wireless telephone 10 is not set to default to enabling call forwarding, the wireless telephone 10 simply powers down (step 328).

If the user decides to not enable call forwarding (decision 338), the wireless telephone 10 powers down the wireless telephone 10 in step 328. If the user decides to enable call forwarding (decision 340), the wireless telephone 10 checks CALL FORWARDING MEMORY 26 (FIG. 1) to see if there are any call forwarding telephone numbers stored in memory (decision 346). If there are no call forwarding telephone numbers stored in the CALL FORWARDING MEMORY 26, the wireless telephone 10 will prompt the user to enter a telephone number (step 370). If there is at least one telephone number stored in CALL FORWARDING MEMORY 26, the wireless telephone 10 will prompt the user with the telephone number and a message asking if the user wishes to use the telephone number shown (step 348). At this time, the user is given a specific amount of time to enter an affirmative <Y>, request the wireless telephone 10 to show a different number from memory <CYCLE>, or manually enter a telephone number <MAN>. The decision blocks 350, 352, 354, 356, and 358 represent processing of the user input. If the user should press any key other than the three permitted keys, the wireless telephone 10 will notify the user of the error (step 360) by beeping an error tone and returning to process user input.

If the user allows the time to expire (decision 350), the wireless telephone 10 again examines (decision 362) PHONE CONFIGURATION MEMORY 28 (FIG. 1) to see if the wireless telephone 10 is set to default to enable call forwarding and proceeds similarly to that described above with respect to decision 344. If the user decides to have the wireless telephone 10 display a different telephone number (decision 354), the wireless telephone 10 will check (decision 364) if there are any additional telephone numbers stored in CALL FORWARDING MEMORY 26 (FIG. 1). If not, the wireless telephone 10 will go back to the beginning of the CALL FORWARDING MEMORY 26 and select the first stored telephone number stored (steps 366, 368), otherwise simply selecting the next telephone number in CALL FORWARDING MEMORY 26 (step 368). After selecting the next telephone number in CALL FORWARDING MEMORY 26, the wireless telephone 10 will again display the telephone number and ask if the user wishes to use the displayed telephone number (step 348). If the user decides to use the telephone number displayed in decision 356, the wireless telephone 10 will activate call forwarding to the specified telephone number (step 330) before powering down (step 328).

If the user decides to manually enter a telephone number (decision 358), the wireless telephone 10 will (step 370) prompt the user to enter the telephone number. At this time, the user can use any of the 10 digits keys on the keypad 39

(FIG. 1), concluding with the <STO> key, to enter the telephone number. Decision blocks 372, 374, and 376 represent processing of user input. If the user enters an invalid digit, the wireless telephone 10 will beep an error tone (step 380) and return to decision 372 to process the user input. If the user enters a valid digit (decision 376), the wireless telephone 10 will display the digit (step 378) before further processing user input (decision 372). If the user presses the <STO> key, the wireless telephone 10 will store (step 382) the telephone number in CALL FORWARDING MEMORY 26 (FIG. 1) and then activate call forwarding (step 330) before powering down (step 328). Of course, though not shown, if input ceases after step 370 without a <STO>, as well as if input ceases during any other portion of the described processes, unless indicated otherwise, a time-out default evaluation is processed, similar that described above with respect to decision 344.

Figure 4:
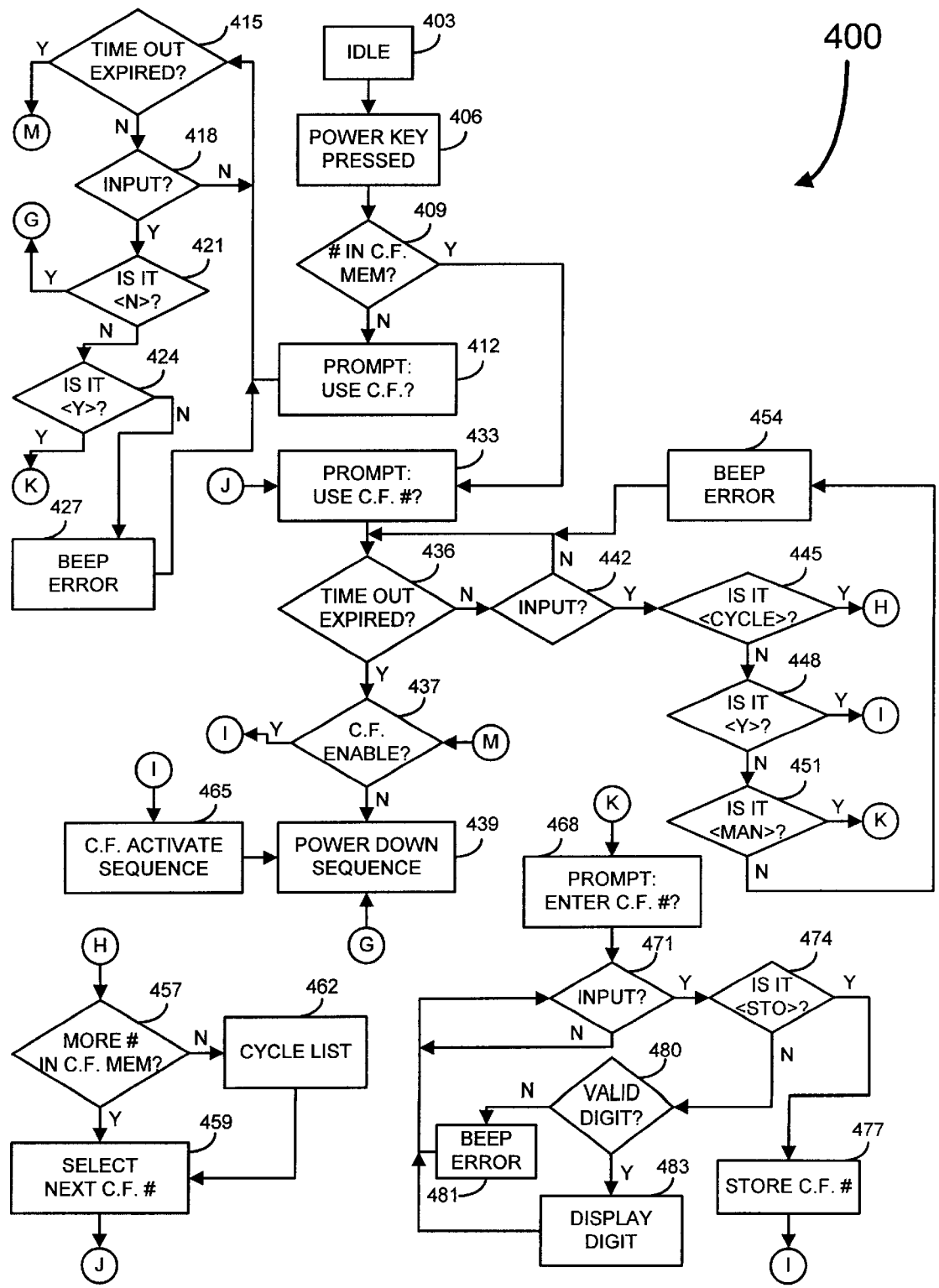
FIG. 4 is a flow chart representation of the steps taken by the wireless telephone during the power down automatic activation of call forwarding based on list-based user intervention, in accordance with the third preferred embodiment of the present invention.

Refer now to FIG. 4 which shows a flow chart of the steps taken by the wireless telephone 10 (FIG. 1) during a call forwarding activation process 400 according to a third preferred embodiment of the present invention which uses user input but does not include location information analysis. Thus, with the exception of the few differences discussed below and the omission of providing location-based suggested call forwarding telephone number, process 400 is very similar to process 300 of FIG. 3. After idle mode (step 403) and the detection of a power down indication from the user (step 406), the wireless telephone determines (decision 409) whether any telephone numbers are stored in CALL FORWARDING MEMORY 26 (FIG. 1). If there are no numbers stored in CALL FORWARDING MEMORY 26, the wireless telephone 10 will ask if the user wishes to use call forwarding (step 412). At this time, the user is given a specific amount of time to enter an affirmative <Y> or a negative <N>. The decision blocks 415, 418, 421, and 424 represent the processing of user input. If the user should press any key other than the two permitted keys, the wireless telephone 10 will notify the user of the error (step 427) by beeping an error tone and returning to processing user input. If the user allows the time to expire (decision 415), a time-out default evaluation is processed (decision 437 and steps 465 and 439), similar that described above with respect to decision 344. Otherwise, if the user decides to not use call forwarding (decision 421), then the wireless telephone 10 powers down the wireless telephone 10 (step 439), and if the user decides to use call forwarding, then the wireless telephone 10 will prompt the user to manually enter a telephone number (step 468), with subsequent steps being similar to those discussed above after step 370. Similarly, if there are telephone numbers stored in CALL FORWARDING MEMORY 26 (FIG. 1), then the wireless telephone 10 will select and display the first telephone number for user selection (step 433), with remaining steps being similar to those after step 348 discussed above.

Figure 5:
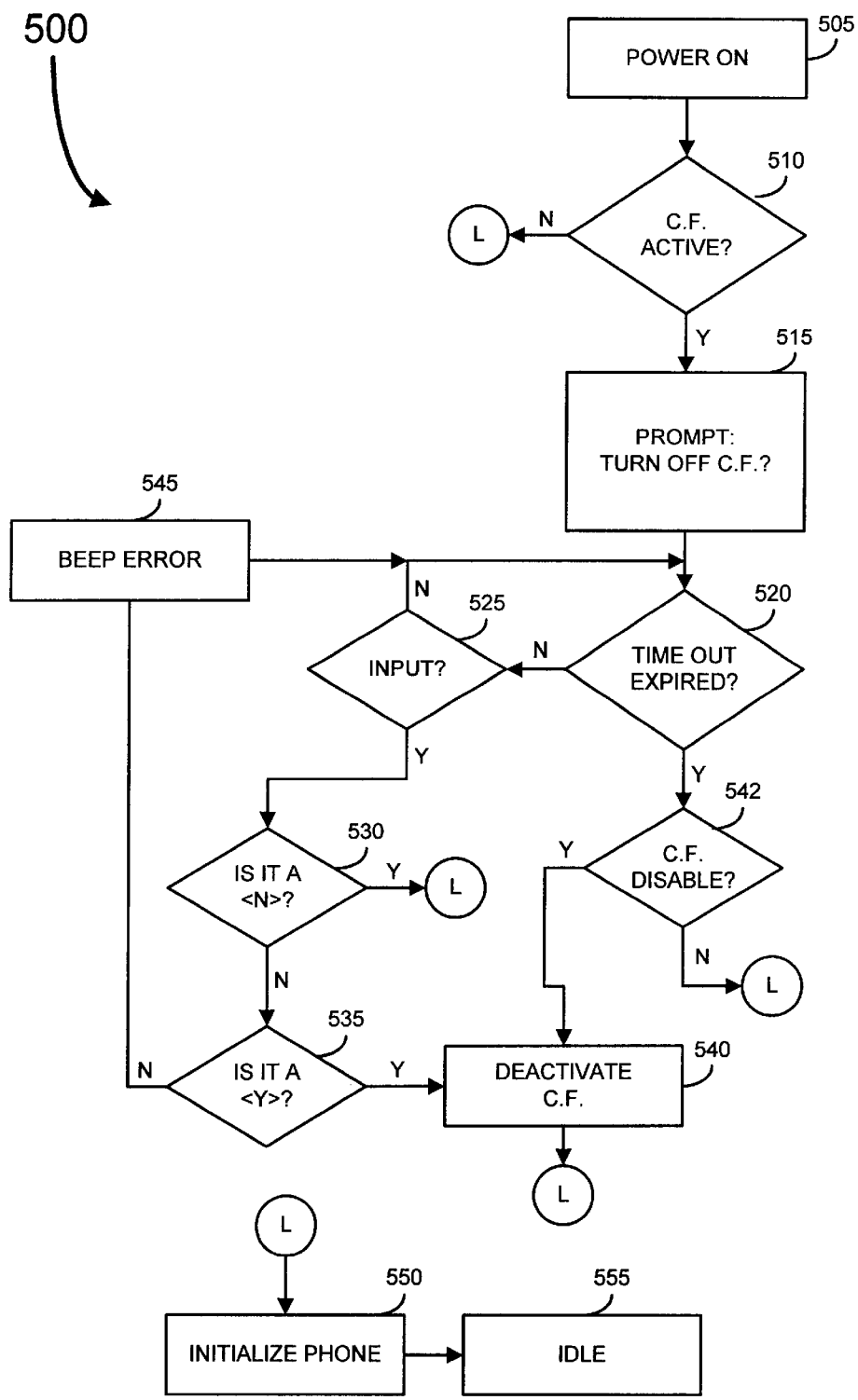
FIG. 5 is a flow chart representation of the steps taken by the wireless telephone during the power deactivation of call forwarding with user intervention, in accordance with one preferred embodiment of the present invention.

Refer now to FIG. 5 which shows a flow chart of the steps taken by the wireless telephone 10 (FIG. 1) during a call forwarding deactivation process 500 during a power up sequence according to one embodiment of the present invention. After the wireless telephone 10 detects a power key being pressed, the wireless telephone 10 checks PHONE CONFIGURATION MEMORY 28 (FIG. 1) to see if call forwarding is active (decision 510) due to having been activated the last time the wireless telephone 10 was powered down. If call forwarding was activated the last time the wireless telephone 10 was turned off, then the wireless telephone 10 will ask the user if the user wishes to turn off call forwarding (step 515). At this time, the user is given a specified amount of time to enter an affirmative <Y> or a negative <N>. The decision blocks 520, 525, 530, and 535 represent processing of the user input. If the user should press any key other than the two permitted keys, the wireless telephone 10 will notify the user of the error (step 545) by beeping an error tone and returning to process user input.

If the user wishes to not deactivate call forwarding (decision 530), then the wireless telephone 10 moves to initialize the wireless telephone 10 (step 550) and proceed to idle mode (step 555). If the user wishes to deactivate call forwarding (decision 535), then the wireless telephone 10 deactivates call forwarding (step 540) before continuing with initialization as previously discussed (steps 550, 555). In one embodiment of the present invention, only one sequence for deactivating call forwarding is stored in PHONE CONFIGURATION MEMORY 28 (FIG. 1). However, in alternate embodiments, since particular wireless telephone systems have different sequences of operations required for the deactivation of call forwarding, stored in the PHONE CONFIGURATION MEMORY 28 (FIG. 1) are the sequences required to deactivate call forwarding for various wireless telephone systems, indexed by system identification code (SID). Thus, during the power up procedure, the wireless telephone 10 of those alternate embodiments includes using the first detected SID to automatically determine which call forwarding deactivation sequence to use. According to other embodiments of the present invention, power up deactivation of call forwarding is completely automatic, thus allowing no user input during power up.

If the user allows the time to expire (decision 520), the wireless telephone 10 will examine (decision 542) PHONE CONFIGURATION MEMORY 28 (FIG. 1) to see if the wireless telephone 10 is set to default to deactivate (disable) call forwarding. If the wireless telephone 10 is set to default to deactivate call forwarding, then the wireless telephone 10 will deactivate call forwarding (step 540) and continue as discussed above.

Figure 6:
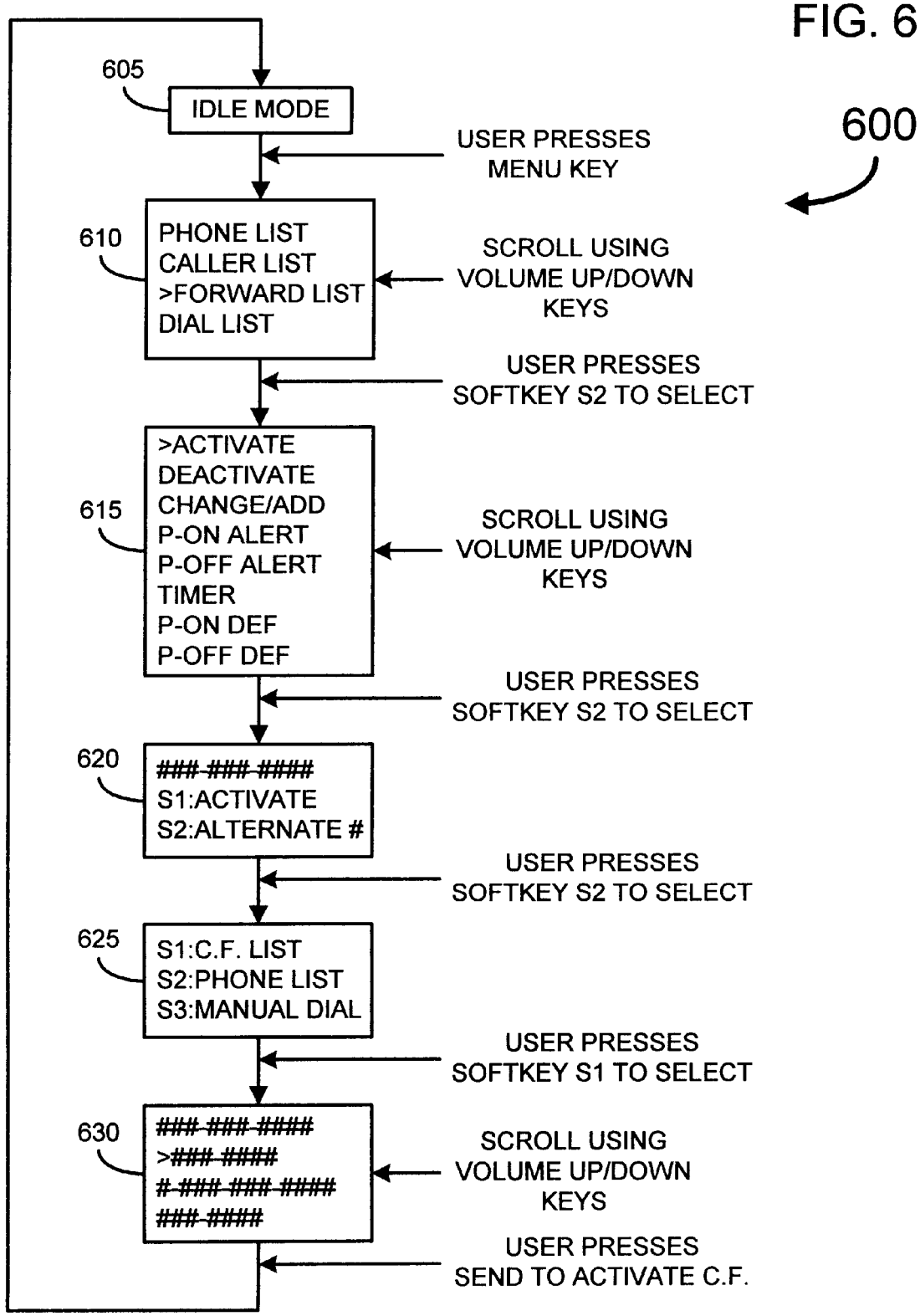
FIG. 6 is a block diagram representation of the call forwarding programming menu structure for user activation of call forwarding, in accordance with one preferred embodiment of the present invention.

Refer now to FIG. 6 which shows a block diagram representation of a call forwarding programming menu structure for real-time user activation of call forwarding 600, in accordance with one preferred embodiment of the present invention. The wireless telephone 10 (FIG. 1) is initially in the idle state 605 until the user presses the MENU key on the keypad 39 (FIG. 1). Once in the menu structure, box 610, the user cycles through the top layer menu by pressing the volume up/down keys. Each press of the volume up/down key will scroll the top layer menu up/down. The user will then highlight the "FORWARD LIST" menu and press an <S2> key to enter a "FORWARD LIST" submenu. Once in the "FORWARD LIST" submenu, box 615, the user once again uses the volume up/down keys to scroll through the submenu. The user highlights the "ACTIVATE" entry and presses the <S2> key to enter a third level menu. Once in the "ACTIVATE" level menu, box 620, the user is presented with a telephone number from the CALL FORWARDING MEMORY 26 (FIG. 1) and the option of using that telephone number by pressing <S1> or to select an alternate telephone number by pressing <S2>. The user presses the <S2> key to select an alternate telephone number. In the select an alternate telephone number menu, box 625, the user can select from telephone numbers in the CALL FORWARDING MEMORY 26 or the SPEED DIAL MEMORY 25 (FIG. 1) or manually enter a telephone number. The user presses the <S1> key to select a telephone number from the CALL FORWARDING MEMORY 26. The wireless telephone 10 displays the telephone numbers stored in the CALL FORWARDING MEMORY 26 in box 630. Once again, the user uses the volume up/down keys to scroll through the list of stored telephone numbers. Once the user finds the one that is desired, the users presses the SEND key to activate call forwarding. The steps in using a telephone number stored in the SPEED DIAL MEMORY 25 or manually entering a telephone number is very similar to that described above. In alternate embodiments, associated alphabetic character tags and memory locations can be used to select stored telephone numbers.

Figure 7:
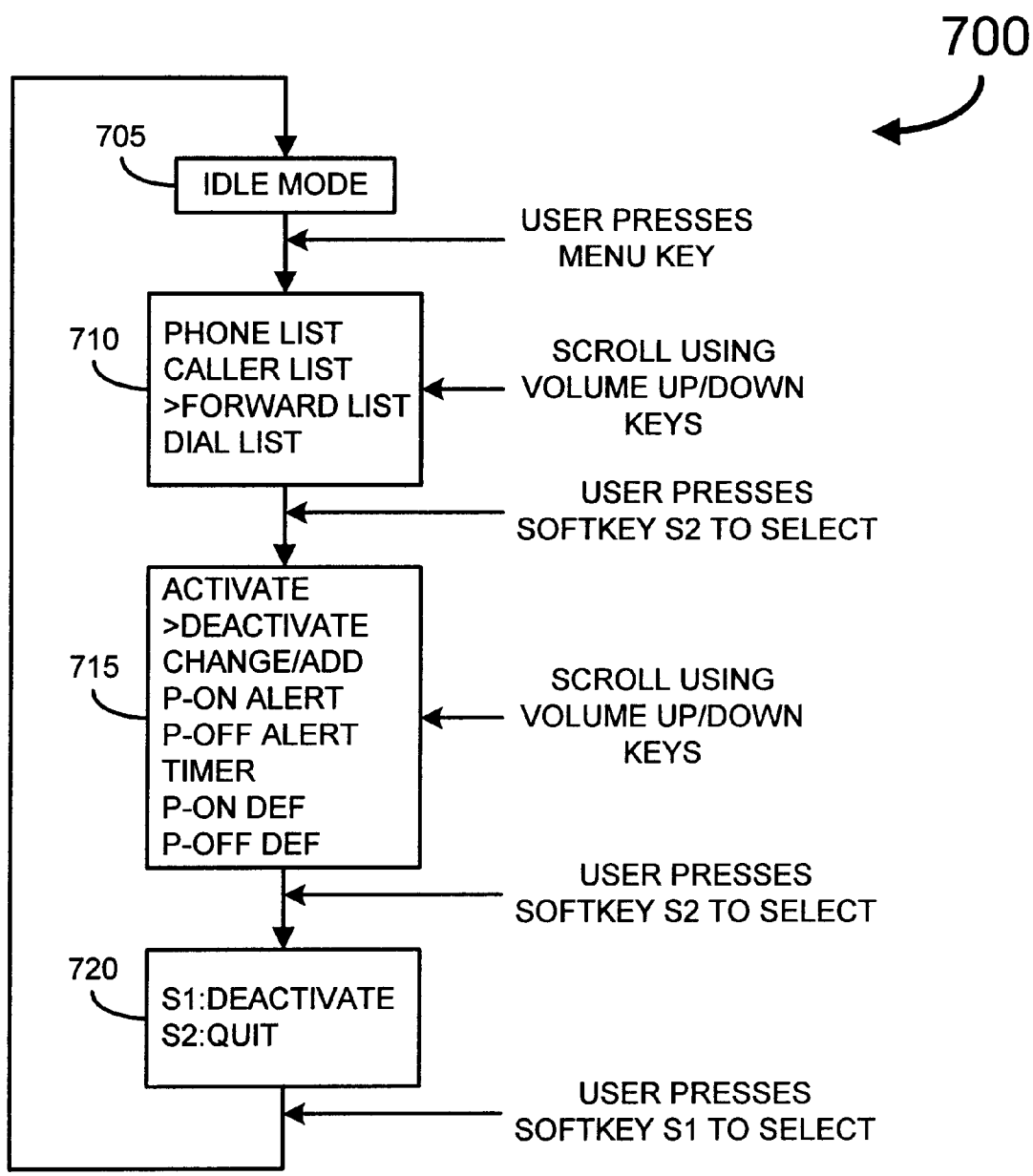
FIG. 7 is a block diagram representation of the call forwarding programming menu structure for user deactivation of call forwarding, in accordance with one preferred embodiment of the present invention.

Refer now to FIG. 7 which shows a block diagram representation of a call forwarding programming menu structure for user deactivation of call forwarding 700, in accordance with one preferred embodiment of the present invention. The wireless telephone 10 (FIG. 1) is initially in the idle state 705 until the user presses the MENU key on the keypad 39 (FIG. 1). Once in the menu structure, box 710, the user cycles through the top layer menu by pressing the volume up/down keys. Each press of the volume up/down key will scroll the top layer menu up/down. The user will then highlight the "FORWARD LIST" menu and press the <S2> key to enter the "FORWARD LIST" submenu. Once in the "FORWARD LIST" submenu, box 715, the user once again uses the volume up/down keys to scroll through the submenu. The user highlights the "DEACTIVATE" entry and presses the <S2> key to enter the third level menu. Once in the "DEACTIVATE" level menu, box 720, the user is presented with two options: deactivate call forwarding or quit. The user presses the <S1> key to deactivate call forwarding. The wireless telephone 10 then returns to idle state.

Figure 8:
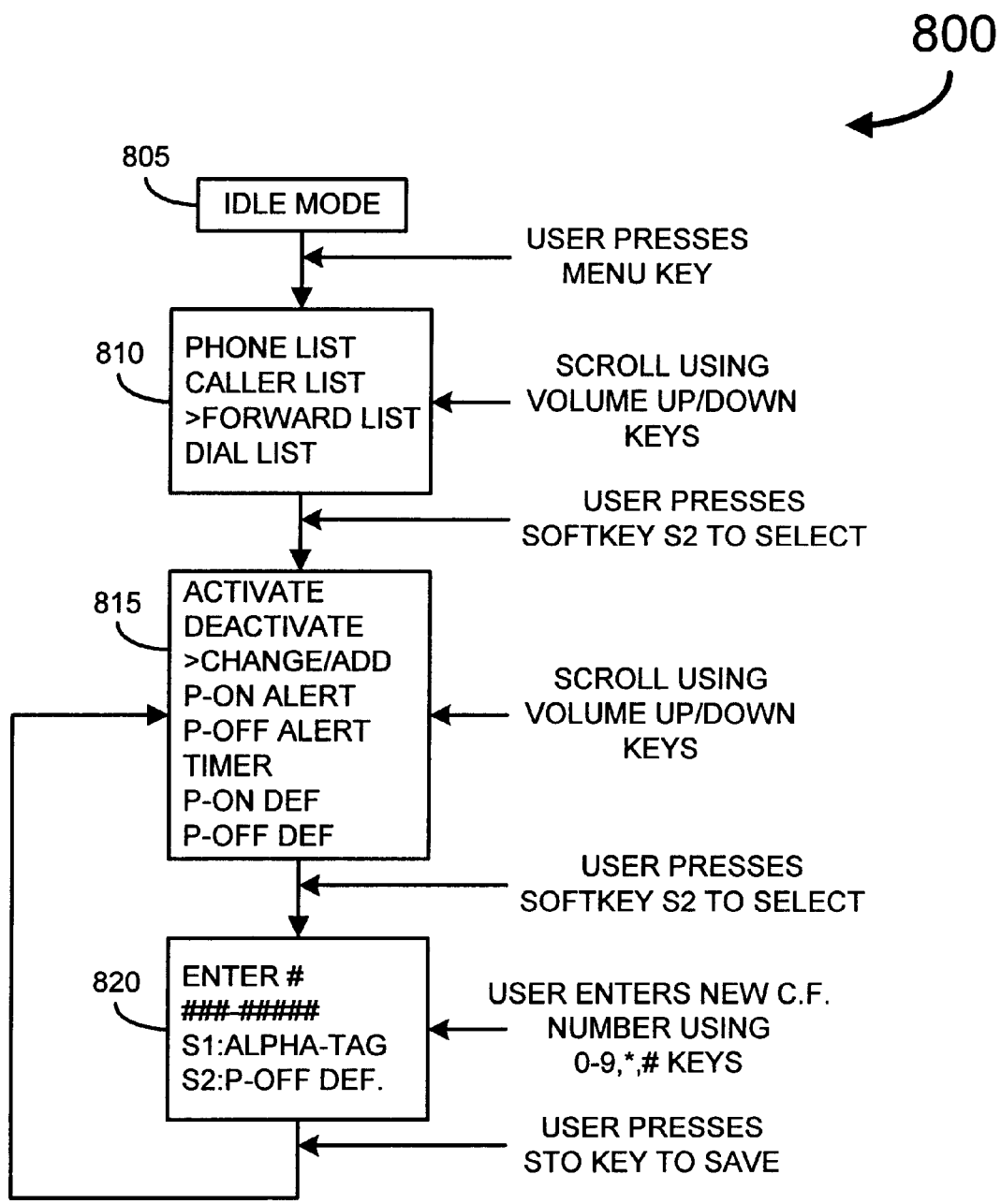
FIG. 8 is a block diagram representation of the call forwarding programming menu structure for user addition of a new call forwarding number into call forwarding memory, in accordance with one preferred embodiment of the present invention.

Refer now to FIG. 8 which shows a block diagram representation of the call forwarding programming menu structure for user modification to the call forwarding list 800, in accordance with one preferred embodiment of the present invention. The wireless telephone 10 (FIG. 1) is initially in the idle state 805 until the user presses the MENU key on the keypad 39 (FIG. 1). Once in the menu structure, box 810, the user cycles through the top layer menu by pressing the volume up/down keys. Each press of the volume up/down key will scroll the top layer menu up/down. The user will then highlight the "FORWARD LIST" menu and press the <S2> key to enter the "FORWARD LIST" submenu. Once in the "FORWARD LIST" submenu, box 815, the user once again uses the volume up/down keys to scroll through the submenu. The user highlights the "CHANGE/ADD" entry and presses the <S2> key to enter the third level menu. If there are no telephone numbers already stored in CALL FORWARDING MEMORY 26 (FIG. 1), then the wireless telephone 10 will prompt the user to enter a telephone number, as shown in box 820. Once the user enters a telephone number, the user presses the STO key to store the telephone number. If there are already telephone numbers stored in the CALL FORWARDING MEMORY 26, the wireless telephone 10 will display the list of telephone numbers stored in memory. The user will then use the volume up/down keys to select the telephone number to change and press the <S2> key to enter the change telephone number display. If the user wishes to enter a completely new telephone number, the user will scroll to the bottom of the list and the wireless telephone 10 will display a blank telephone number for the user to enter a new telephone number. After completion, the wireless telephone 10 is placed in idle state.

Figure 9:
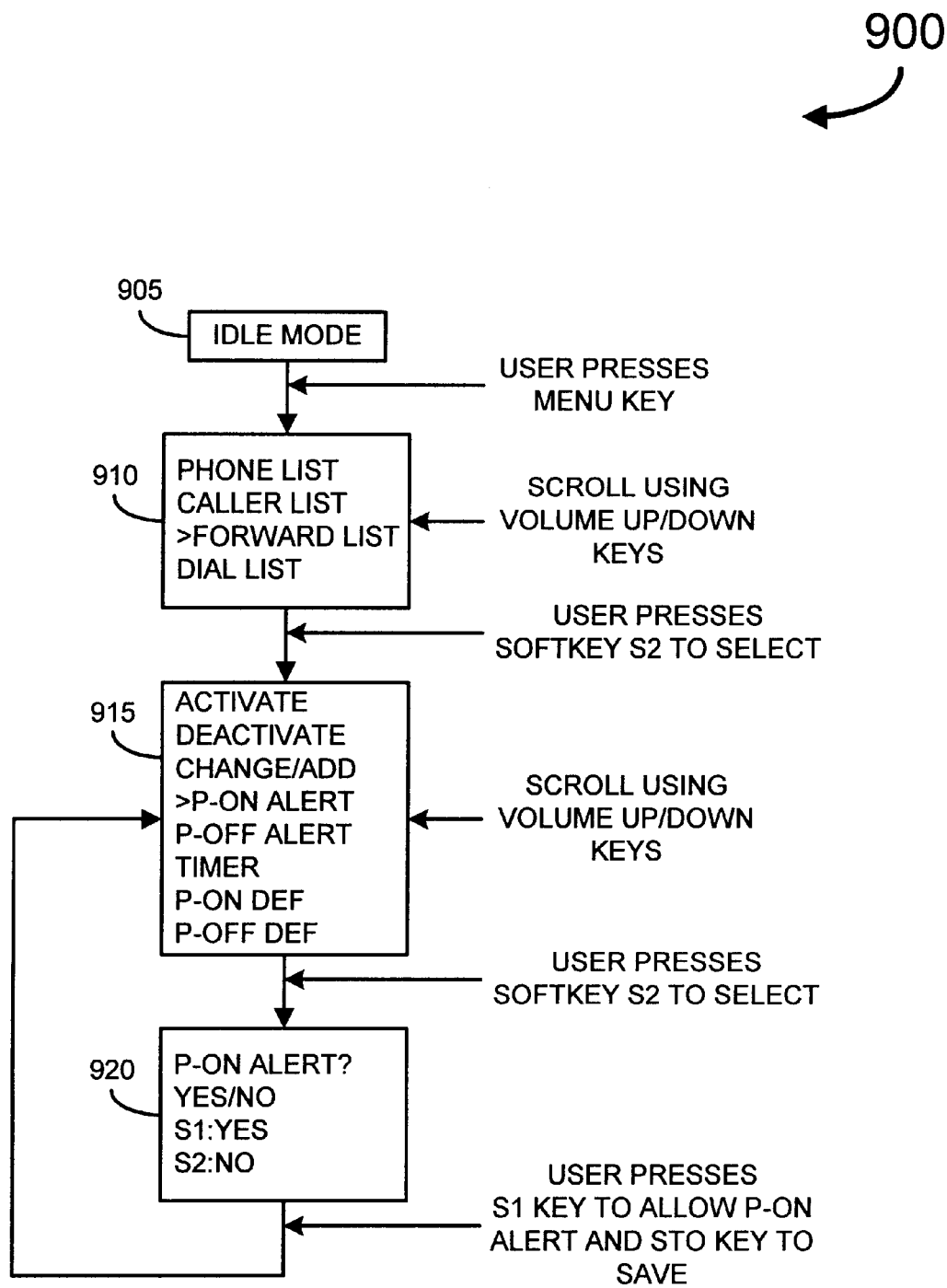
FIG. 9 is a block diagram representation of the call forwarding programming menu structure for user programming of the power on call forwarding alert message, in accordance with one preferred embodiment of the present invention.

Refer now to FIG. 9 which shows a block diagram representation of the call forwarding programming menu structure for user modification of the telephone configuration and defaults of the call forwarding feature 900, in accordance with one preferred embodiment of the present invention. The wireless telephone 10 (FIG. 1) is initially in the idle state 905 until the user presses the MENU key on the keypad 39 (FIG. 1). Once in the menu structure, box 910, the user cycles through the top layer menu by pressing the volume up/down keys. Each press of the volume up/down key will scroll the top layer menu up/down.

The user will then highlight the "FORWARD LIST" menu and press the <S2> key to enter the "FORWARD LIST" submenu. Once in the "FORWARD LIST" submenu, box 915, the user once again uses the volume up/down keys to scroll through the submenu. The user highlights the "P-ON ALERT" entry and presses the <S2> key to enter the third level menu. The user is then presented with a display similar to that which is shown in box 920. The user can either select yes or no by pressing the <S1> or the <S2> keys. After making the selection, the user presses the STO key to save the selection. The user is brought back to a display like the one shown in box 915 where the user can set other telephone configuration and default parameters. The P-ON ALERT and P-OFF ALERT settings are indicative of whether the user wishes to be prompted to decide at power on and power off, respectively, if call forwarding should be deactivated or activated, respectively. The TIMER setting allows the user to vary the amount of time for the time-out in waiting for user input. The time-out defaults for activating or deactivating are represented by settings P-OFF DEF and P-ON DEF, respectively.

Other embodiments of the present invention include storing separate sets of settings for various SIDs.

Refer now to FIG. 10 which shows a block diagram representation of the CALL FORWARDING MEMORY 26 (FIG. 1) 1000, in accordance with one preferred embodiment of the present invention. Each entry in the CALL FORWARDING MEMORY 26 consists of four different fields. The first field, 1005, is the telephone number field. This field is used to store the telephone number. The second field, 1010, is the alpha-numeric tag field. This field is used to store an alpha-numeric tag to associate with the telephone number. The third field, 1015, is the location field. This field is used to store the unique location information to be associated with the telephone number. The final field, 1020, is the power down default field. This field is use to over-ride the telephone default when the wireless telephone 10 is powered down. If this field is set to YES, then when the wireless telephone 10 will activate call forwarding when it is powered down, regardless of what is stored in PHONE CONFIGURATION MEMORY 28 (FIG. 1)

Another alternate embodiment of the present invention includes automatically forwarding calls to a location-determined number whenever the location is detected by the wireless telephone 10. Thus, as a wireless telephone 10 determines that it is nearing a known destination, such as a home or a work place, call forwarding is activated automatically, before any power down sequence, and is only deactivated when the wireless telephone 10 senses leaving the defined location.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the corresponding structures, materials, acts, and equivalents of any means- or step-plus-function elements in the claims below are hereby described to include any structure, material, or acts for performing the claimed functions in combination with other claimed elements as specifically claimed.

We claim:

1. A method in a mobile station of automatic activation of call forwarding for the mobile station, wherein calls made to the mobile station are transferred to an alternate destination number, and wherein the mobile station is operable with at least one base station said method comprising steps of:

determining at the mobile station an alternate destination number for automatic activation of call forwarding; and automatically activating call forwarding to the alternate destination number through communication from the mobile station to the at least one base station.

2. The method of claim 1, wherein the step of determining at the mobile station an alternate destination number for automatic activation of call forwarding includes a step of:

determining at the mobile station a location of the mobile station from signals received from the at least one base station communicating with the mobile station.

3. The method of claim 2, wherein the step of determining the location of the mobile station includes a step of:

establishing the mobile station location based on identification information received from only one base station communicating with the mobile station.

4. The method of claim 2, wherein the step of determining the location of the mobile station includes a step of:

establishing the mobile station location based on identification information received from a plurality of base stations communicating with the mobile station.

5. The method of claim 4, wherein the step of determining the location of the mobile station further includes a step of:

establishing the mobile station location based on strengths of signals received from the plurality of base stations.

6. The method of claim 1, wherein the steps of determining and automatically activating call forwarding include steps of:

detecting a system identification code from received base station information;

determining whether the system identification code matches a stored system identification code in an automatic call forwarding memory; and executing a corresponding stored activation sequence from the automatic call forwarding memory if the received system identification code matches a predefined system identification code in automatic call forwarding memory.

7. The method of claim 1, wherein the automatically activating step is responsive to execution of a power down sequence of the mobile station.

8. The method of claim 7, wherein the automatically activating step is further responsive to steps of:

prompting a user for permission to activate automatic call forwarding; and evaluating user input to determine whether permission has been granted for automatic call forwarding.

9. The method of claim 7, wherein the automatically activating step is further responsive to a step of:

determining whether the mobile station has been configured for automatic call forwarding.

10. The method of claim 7, wherein the determining and automatically activating are executed independent of user interaction during the power down sequence.

11. The method of claim 8, wherein the step of prompting the user for permission to activate automatic call forwarding further includes steps of:

locating the alternate destination number in memory based on identification information received from the base station; and including the alternate destination number in the prompt to the user, wherein the method further comprises a step of powering down without activating call forwarding after a predetermined amount of time without user response.

12. The method of claim 8, wherein the step of prompting the user for permission to activate automatic call forwarding further includes steps of:

locating the alternate destination number in memory based on identification information received from the base station; and including the alternate destination number in the prompt to the user, wherein the method further includes a step of powering down after activating call forwarding after a predetermined amount of time without user response.

13. The method of claim 8, wherein the step of prompting the user for permission to activate automatic call forwarding further includes a step of:

evaluating user input designating an alternate destination number when an alternate destination number is not found in memory for identification information received from the base station.

14. The method of claim 1, further including a step of deactivating automatic call forwarding during a power up sequence of the mobile station.

15. The method of claim 1, wherein the determining step includes steps of:

evaluating user input of a sequence of keys to enter an automatic call forwarding programming mode;

evaluating user input of alternate destination numbers into automatic call forwarding memory; and evaluating user selections received responsive to prompting at power up and power down.

16. A mobile station apparatus operable with at least one base station, configured for activating automatic call forwarding, wherein calls made to a mobile station are transferred to an alternate destination number, comprising:

means at the mobile station for determining an alternate destination number for automatic activation of call forwarding; and means at the mobile station for automatically activating call forwarding to the alternate destination number through communication from the mobile station to the at least one base station.

17. The apparatus of claim 16, wherein the means at the mobile station for determining an alternate destination number for automatic activation of call forwarding further includes:

means for determining at the mobile station a location of the mobile station from signals received from at least one base station communicating with the mobile station.

18. The apparatus of claim 17, wherein the means for determining the location of the mobile station includes:

means for establishing the mobile station location based on identification information received from only one base station communicating with the mobile station.

19. The apparatus of claim 17, wherein the means for determining the location of the mobile station includes:

means for establishing the mobile station location based on identification information received from a plurality of base stations communicating with the mobile station.

20. The apparatus of claim 19, wherein the means for determining the location of the mobile station further includes:
means for establishing the mobile station location based on strengths of signals received from the plurality of base stations.

21. The apparatus of claim 16, wherein the determining and automatically activating means include:
means for detecting a system identification code from received base station information;
means for determining whether the system identification code matches a stored system identification code in an automatic call forwarding memory; and
means for executing a corresponding stored activation sequence from the automatic call forwarding memory if the received system identification code matches a predefined system identification code in automatic call forwarding memory.

22. The apparatus of claim 16, wherein the automatically activating means includes means responsive to the execution of a power down sequence of the mobile station.

23. The apparatus of claim 22, wherein the automatically activating means further includes:
means for prompting a user for permission to activate automatic call forwarding; and
means for evaluating user input to determine whether permission has been granted for automatic call forwarding.

24. The apparatus of claim 23, wherein the means for prompting the user for permission to activate automatic call forwarding further includes:
means for locating the alternate destination number in memory based on identification information received from the base station, wherein the prompting includes the alternate destination number; and
wherein the apparatus further includes means for powering down without activating call forwarding after a predetermined amount of time without user response.

25. The apparatus of claim 23, wherein the means for prompting the user for permission to activate automatic call forwarding further includes:
means for locating the alternate destination number in memory based on identification information received from the base station wherein the prompting includes the alternate destination number; and
wherein the apparatus further includes means for powering down after activating call forwarding after a predetermined amount of time without user response.

26. The apparatus of claim 23, wherein the means for prompting the user for permission to activate automatic call forwarding further includes:
means for evaluating user input designating an alternate destination number when an alternate destination number is not found in memory for identification information received from the base station.

27. The apparatus of claim 22, wherein the automatically activating means further includes:
means for automatically determining whether the mobile station is configured for automatic call forwarding; and
means for activating automatic call forwarding responsive to said determination.

28. The apparatus of claim 22, wherein the determining and automatically activating means operate independent of user interaction during the power down sequence.

29. The apparatus of claim 16, further includeing means for deactivating automatic call forwarding during a power up sequence of the mobile station.

30. The apparatus of claim 16, wherein the determining means includes:
means for evaluating user input of a sequence of keys to enter an automatic call forwarding programming mode;
means for evaluating user input of alternate destination numbers into automatic call forwarding memory; and
means for evaluating user selections received responsive to prompting at power up and power down.

31. A mobile station apparatus operable with at least one base station, configured for activating automatic call forwarding, wherein calls made to a mobile station are transferred to an alternate destination number, comprising:
an arbitrator at the mobile station for determining an alternate destination number for automatic activation of call forwarding; and
an activator at the mobile station for automatically activating call forwarding to the alternate destination number through communication from the mobile station to the at least one base station.

32. The apparatus of claim 31, wherein the activator at the mobile station for determining an alternate destination number for automatic activation of call forwarding further includes:
an arbitrator at the mobile station for determining a location of the mobile station from signals received from at least one base station communicating with the mobile station.

33. The apparatus of claim 32, wherein the arbitrator for determining the location of the mobile station includes:
a locator for establishing the mobile station location based on identification information received from only one base station communicating with the mobile station.

34. The apparatus of claim 32, wherein the arbitrator for determining the location of the mobile station includes:
a locator for establishing the mobile station location based on identification information received from a plurality of base stations communicating with the mobile station.

35. The apparatus of claim 34, wherein the arbitrator for determining the location of the mobile station further includes:
a locator for establishing the mobile station location based on strengths of signals received from the plurality of base stations.

36. The apparatus of claim 31, wherein the arbitrator and activator include:
a detector for detecting a system identification code from received base station information;
an arbitrator for determining whether the system identification code matches a stored system identification code in an automatic call forwarding memory; and
an administrator for executing a corresponding stored activation sequence from the automatic call forwarding memory if the received system identification code matches a predefined system identification code in automatic call forwarding memory.

37. The apparatus of claim 31, wherein the activator activates during a power down sequence of the mobile station.

38. The apparatus of claim 37, wherein the activator includes:
an indicator for prompting a user for permission to activate automatic call forwarding; and an evaluator for evaluating user input to determine whether permission has been granted for automatic call forwarding.

39. The apparatus of claim 38, wherein the indicator for prompting the user for permission to activate automatic call forwarding further includes:

the alternate destination number located in memory based on identification information received from the base station; and wherein the apparatus further includes a deactivator for powering down without activating call forwarding after a predetermined amount of time without user response.

40. The apparatus of claim 38, wherein the indicator for prompting the user for permission to activate automatic call forwarding further includes:

the alternate destination number located in memory based on identification information received from the base station; and wherein the apparatus further includes a deactivator for powering down after activating call forwarding after a predetermined amount of time without user response.

41. The apparatus of claim 38, wherein the indicator for prompting the user for permission to activate automatic call forwarding further includes:

a prompt requesting user entry of the alternate destination number when the alternate destination number is not found in memory for identification information received from the base station.

42. The apparatus of claim 37, wherein the activator further includes:

an arbitrator for automatically determining whether the mobile station is configured for automatic call forwarding; and an activator for activating automatic call forwarding responsive to said determination.

43. The apparatus of claim 37, wherein the arbitrator and activator operate independent of user interaction during the power down sequence.

44. The apparatus of claim 31, further includeing a deactivator for deactivating automatic call forwarding during a power up sequence of the mobile station.

45. The apparatus of claim 31, wherein the arbitrator includes:

an evaluator for evaluating user input of a sequence of keys to enter an automatic call forwarding programming mode;

an evaluator for evaluating user input of alternate destination numbers into automatic call forwarding memory; and an evaluator for evaluating user selections received responsive to prompting at power up and power down.

* * * * *